United States Patent
Vogt et al.

(10) Patent No.: US 8,728,370 B2
(45) Date of Patent: *May 20, 2014

(54) POLYOLEFINIC MOLDING COMPOSITION HAVING IMPROVED RESISTANCE TO THERMOOXIDATIVE DEGRADATION AND ITS USE FOR THE PRODUCTION OF PIPES

(75) Inventors: Heinz Vogt, Frankfurt (DE); Hansjörg Nitz, Frankfurt (DE)

(73) Assignee: Basell Polyolefin GmbH, Wesseling (DE)

( * ) Notice: Subject to any disclaimer, the term of this patent is extended or adjusted under 35 U.S.C. 154(b) by 348 days.

This patent is subject to a terminal disclaimer.

(21) Appl. No.: 11/920,310

(22) PCT Filed: May 6, 2006

(86) PCT No.: PCT/EP2006/004251
§ 371 (c)(1),
(2), (4) Date: Nov. 13, 2007

(87) PCT Pub. No.: WO2006/119935
PCT Pub. Date: Nov. 16, 2006

(65) Prior Publication Data
US 2009/0069477 A1     Mar. 12, 2009

Related U.S. Application Data

(60) Provisional application No. 60/688,397, filed on Jun. 8, 2005.

(30) Foreign Application Priority Data

May 13, 2005   (DE) .................. 10 2005 023 040

(51) Int. Cl.
*D01D 5/24*     (2006.01)
(52) U.S. Cl.
USPC ............... 264/209.1; 264/176.1; 524/376; 524/377; 524/378; 524/386; 524/387; 524/388
(58) Field of Classification Search
USPC ............ 524/377, 386, 387, 388, 376, 378; 264/176.1, 209.1; 138/DIG. 7
See application file for complete search history.

(56) References Cited

U.S. PATENT DOCUMENTS

| | | | |
|---|---|---|---|
| 3,222,314 A | 12/1965 | Wolinski et al. | |
| 3,902,532 A * | 9/1975 | Carrow | 138/177 |
| 4,013,622 A * | 3/1977 | DeJuneas et al. | 524/388 |
| 4,186,123 A | 1/1980 | Kietzman | |
| 4,737,547 A * | 4/1988 | White | 525/193 |
| 4,855,360 A * | 8/1989 | Duchesne et al. | 525/187 |
| 5,047,455 A * | 9/1991 | Hesse et al. | 523/508 |
| 5,378,747 A | 1/1995 | Wilcox et al. | |
| 5,534,572 A | 7/1996 | Taylor et al. | |
| 6,294,604 B1 * | 9/2001 | Focquet et al. | 524/433 |
| 6,313,208 B1 | 11/2001 | Nosu et al. | |
| 6,362,258 B1 | 3/2002 | Avakian et al. | |
| 6,552,129 B2 * | 4/2003 | Babb et al. | 525/194 |
| 6,787,591 B2 * | 9/2004 | Koch et al. | 524/102 |
| 2005/0070644 A1 | 3/2005 | Tikuisis et al. | |

FOREIGN PATENT DOCUMENTS

| | | |
|---|---|---|
| EP | 781803 | 7/1997 |
| JP | 09143318 | 6/1997 |
| JP | 2000-072860 | 3/2000 |
| JP | 2001064457 A | 3/2001 |
| JP | 3574689 B2 | 10/2004 |
| JP | 4577917 B2 | 11/2010 |
| WO | 01/90230 | 11/2001 |

OTHER PUBLICATIONS

Römpp Chemie Lexikon, "Polyalkenamere," Georg Thieme Verlag (2002); XP002388513.
Diedrich, Dr. Klaus et al., "High Performance Polymers", Vestenamer Degussa AG, High Performance Polymers, 45764 MARL Germany, 1-12.
Diedrich, Dr. Klaus et al., "High Performance Polymers", Vestenamer Degussa AG, High Performance Polymers, 45764 MARL Germany, 1-12.

* cited by examiner

*Primary Examiner* — David W Wu
*Assistant Examiner* — Marie Reddick

(57) ABSTRACT

A molding composition is suitable for the production of pipes having improved resistance to thermooxidative degradation when these pipes are in long-term contact with liquids comprising disinfectants having an oxidizing effect. Such molding composition comprises, in addition to thermoplastic polyolefins, a polyoxy compound and/or a polyhydroxy compound as additive in an amount of from 0.01 to 1.0% by weight. In addition, the molding composition can further comprise an unsaturated aliphatic hydrocarbon in an amount of up to 5% by weight. The invention also relates to a process for improving the long-term resistance of water pipes to damage caused by oxidizing disinfectants from the water by use of this molding composition.

6 Claims, No Drawings

POLYOLEFINIC MOLDING COMPOSITION HAVING IMPROVED RESISTANCE TO THERMOOXIDATIVE DEGRADATION AND ITS USE FOR THE PRODUCTION OF PIPES

This application is the U.S. national phase of International Application PCT/EP2006/004251, filed May 6, 2006, claiming priority to German Patent Application 102005023040.7 filed May 13, 2005, and the benefit under 35 U.S.C. 119(e) of U.S. Provisional Application No. 60/688,397, filed Jun. 8, 2005; the disclosures of International Application PCT/EP2006/004251, German Patent Application 102005023040.7 and U.S. Provisional Application No. 60/688,397, each as filed, are incorporated herein by reference.

The present invention relates to a polyolefinic molding composition which has improved resistance to thermooxidative degradation and is particularly suitable for producing pipes which are in long-term contact with liquids comprising disinfectants having an oxidizing effect.

Molding compositions comprising polyethylene (PE), polypropylene (PP) and poly-1-butene (PB-1) have for many years been used for producing plastic pipes for the distribution of cold and hot water, preferably in buildings.

Although the pipes comprising the plastics mentioned have very good resistance to water, it has been found that their life is severely limited when the pipes come into contact with customary disinfectants which are often added to the water for hygiene reasons. This is important because small amounts of oxidizing substances such as chlorine gas, Na-hypochloride (bleaching liquor), calcium hypochloride or chlorine dioxide are generally added as disinfectants to municipal mains water. Hydrogen peroxide ($H_2O_2$) or ozone is sometimes also used.

The polyethylene pipes can be uncrosslinked or crosslinked. Crosslinking can be effected by the customary industrial crosslinking processes by means of organic peroxides, grafted vinylsilane esters or by means of high-energy radiation (γ- or β-rays).

It is therefore an object of the present invention to develop a novel molding composition which is based on polyolefins such as polyethylene (PE), polypropylene (PP) or poly-1-butene (PB-1) and retains good processability to produce pipes with an improved stability when these are used for mains water comprising disinfectants having an oxidizing effect.

This object is achieved by a molding composition of the generic class mentioned at the outset, whose distinguishing feature is that it comprises a thermoplastic polyolefin and an amount of from 0.01 to 1.0% by weight, based on the total weight of the molding composition, of an organic polyoxy compound having the general chemical formula:

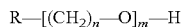

where n is an integer in the range from 1 to 10,
m is an integer in the range from 3 to 500 and
R is a hydrogen atom or an OH group or an alkyl group which has from 1 to 10 carbon atoms and may bear further substituents such as —OH, —COOH, —COOR, —OCH$_3$ or —OC$_2$H$_5$,
or an organic polyhydroxy compound having the general chemical formula:

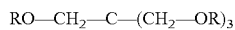

where R can be a hydrogen atom or an alkyl group which has from 1 to 5 carbon atoms and may bear further substituents such as —OH, —COOH, —COOR, —OCH$_3$ or —OC$_2$H$_5$, or a combination of the two.

WO 2001/90230 discloses a polyolefin such as PE or PP which comprises polyethylene glycol in amounts of from 5 to 50% by weight as lubricant and is intended to be used, inter alia, for the production of pipes. However, the high additions of polyethylene glycol described there impair the mechanical properties of the polyolefins and are therefore not suitable for the use of pressure-rated water pipes in buildings.

JP-A 09/143,318 (Nippon) describes a process for producing pipes, in which an LLDPE comprising an additive combination of fluoropolymer plus polyoxyalkylene is processed by extrusion and by means of which die dust is said to be avoided.

The molding composition of the invention differs from the prior art in the incorporation of a smaller amount of polyoxy compound or polyhydroxy compound of the abovementioned chemical composition, which despite its presence in such small amounts gives the pipes comprising the molding composition good stability to the oxidizing effects of disinfectants in water over a long time period, which was particularly surprising.

Polyoxy compounds which have been found to be particularly useful are polyethylene glycol, methoxypolyethylene glycol and polypropylene glycol. Preference is given to using polyoxy compounds which have a mean molar mass in the range from 400 to 9000 g/mol. The preferred amounts in which these polyoxy compounds are used are in the range from 0.01 to 0.5% by weight, particularly preferably from 0.1 to 0.3% by weight.

Polyhydroxy compounds which have been found to be particularly useful are pentaerythritol, trimethylolpropane, glycerol, mannitol and sorbitol. The preferred amounts in which these polyhydroxy compounds are used are in the range from 0.01 to 0.5% by weight, particularly preferably from 0.1 to 0.3% by weight.

In a particular embodiment of the invention, the molding composition may comprise additionally an unsaturated aliphatic hydrocarbon compound having the general chemical formula:

where R$^1$ and R$^4$ are each, independently of one another, —H, —CH$_3$, —OCH$_3$ or —CH$_2$OH and R$^2$ and R$^3$ are each, independently of one another, —H, —CH$_3$, C$_2$H$_5$ or C$_3$H$_7$.

The amount in which the additional unsaturated aliphatic hydrocarbon compound can be present in the molding composition of the invention is variable and is in the range from 0.1 to 5% by weight, based on the total weight of the molding composition.

As unsaturated aliphatic hydrocarbon compounds, preference is given, according to the invention, to polyisoprene, polyoctenamer or polydecenamer.

Thermoplastic polyolefins which are particularly suitable according to the invention are polyolefins such as PE, PP and PB-1 comprising the homopolymers and the copolymers of these with further olefinic monomers having from 4 to 10 carbon atoms, which can readily be processed by the extrusion technology to produce pipes. Such polyolefins can be prepared by polymerization of the monomers in the presence of suitable catalysts such as Ziegler catalysts, Ziegler-Natta catalysts, chromium comprising Phillips catalysts or single side catalysts such as metallocenes or the like.

The polymerization is carried out at temperatures in the range of from 0 to 200° C., preferred from 25 to 150° C. and more preferred from 40 to 130° C. and under a pressure of from 0.05 to 10 MPa and preferred from 0.3 to 4 MPa. The polymerization may be performed dis-continuous or preferred continuous in a single or multiple step process. Thereby it is possible to employ solution polymerization or suspension polymerization or stirred gas phase polymerization or gas phase fluidized bed polymerization. The artisan is familiar with this technology and with processes of this kind as they belong to the general knowledge.

Molding compositions according to the invention can comprise PE which can be linear or non-linear and may have different densities such as high-density PE (HDPE) or medium-density PE (MDPE) or low-density PE (LDPE) or linear-low-density PE (LLDPE). In a preferred embodiment, the molding composition comprises a PE having a density at a temperature of 23° C. in the range of from 0.93 to 0.965 g/cm$^3$ and a melt index $MI_{190/5}$ in the range of from 0.1 to 2 g/10 min.

Molding compositions according to the invention comprising PP can, for example, be high molecular weight isotactic or syndiotactic homopolymers, random copolymers or block copolymers having a melt index $MI_{230/5}$ in the range from 0.1 to 2/10 min.

Molding compositions according to the invention comprising PB-1 can be, for example, homopolymers or copolymers having a melt index $MI_{190/2.16}$ in the range from 0.1 to 1 g/10 min and a density at a temperature of 23° C. in the range from 0.92 to 0.95 g/cm$^3$.

The molding composition of the invention can further comprise additional additives in addition to the thermoplastic polyolefin. Such additives are preferably heat stabilizers and processing stabilizers, antioxidants, UV absorbers, light stabilizers, metal deactivators, peroxide-destroying compounds, organic peroxides, basic costabilizers in amounts of from 0 to 10% by weight, preferably from 0 to 5% by weight, and also carbon black, fillers, pigments or combinations of these in total amounts of from 0 to 30% by weight, based on the total weight of the mixture.

As heat stabilizers, the molding composition of the invention can comprise phenolic antioxidants, in particular pentaerythrityl (3,5-di-tert-butyl-4-hydroxyphenyl)propionate which is obtainable under the trade name IRGANOX from Ciba Specialities, Germany.

It was especially surprising that the molding composition in terms of the present invention can be processed to give pipes having an extraordinary improved long term stability, if such pipes are exposed to and in continuous contact with chlorinated water. Another highly surprising finding was the high resistance to breakthrough of such pipes in combination with their improved organoleptic.

The following working examples are added to better illustrate the advantages of the new molding composition and especially those of the new pipes prepared therefrom. However, the working examples are by no means intended to cause any restrictions in the scope of the invention.

EXAMPLE 1

A high molecular weight medium-density PE powder having a density of 0.946 g/cm$^3$ and a melt flow index $MI_{190/5}$ of 0.3 g/10 min was admixed with 0.1% of polyethylene glycol having a molar mass of 9000 g/mol, 1% of Vestenamer 8012 and 0.35% of IRGANOX 1330 and pelletized at a melt temperature of 220° C. on a ZSK 53 from Coperion Werner & Pfleiderer GmbH & Co KG. The pellets were processed at a melt temperature of 220° C. on a pipe extrusion unit from Battenfeld to produce pipes having a diameter of 16×2 mm, and these were subsequently crosslinked by means of electron beams. The radiation dose applied was 120 kGy. The degree of crosslinking was determined in accordance with DIN EN 16892 and was 66%.

A creep test in accordance with ASTM F2023 was carried out on the crosslinked pipes at 115° C. in the presence of 4 ppm of chlorine at a load of 1.58 MPa. The time-to-failure achieved is shown in table 1.

EXAMPLE 2

The high molecular weight MDPE powder having a density of 0.946 g/cm$^3$ and a melt flow index $MI_{190/5}$ of 0.3 g/10 min from Example 1 was admixed with 0.1% of polyethylene glycol having a molar mass of 400 g/mol and 0.35% of IRGANOX 1330 and pelletized, extruded to produce pipes having a diameter of 16×2 mm and crosslinked at 120 kGy by means of electron beams. The degree of crosslinking was determined in accordance with DIN EN 16892 and was 64%.

A creep test was carried out on the crosslinked pipes at 115° C. in the presence of 4 ppm of chlorine at a load of 1.58 MPa. The test was carried out in accordance with ASTM F2023. The time-to-failure achieved is shown in table 1.

EXAMPLE 3

The high molecular weight MDPE powder having a density of 0.946 g/cm$^3$ and a melt flow index $MI_{190/5}$ of 0.3 g/10 min from Example 1 was admixed with 0.2% of polyethylene glycol having a molar mass of 400 g/mol and 0.35% of IRGANOX 1330 and pelletized, extruded to produce pipes having a diameter of 16×2 mm and crosslinked at 120 kGy by means of electron beams. The degree of crosslinking was determined in accordance with DIN EN 16892 and was 66%.

A creep test was carried out on the crosslinked pipes at 115° C. in the presence of 4 ppm of chlorine at a load of 1.58 MPa. The test was carried out in accordance with ASTM F2023. The time-to-failure achieved is shown in table 1.

EXAMPLE 4

The high molecular weight MDPE powder having a density of 0.946 g/cm$^3$ and a melt flow index $MI_{190/5}$ of 0.3 g/10 min from Example 1 was admixed with 0.1% of polyethylene glycol having a molar mass of 400 g/mol, 1% of Vestenamer 8012 and 0.35% of IRGANOX 1330 and pelletized, extruded to produce pipes having a diameter of 16×2 mm and crosslinked at 120 kGy by means of electron beams. The degree of crosslinking was determined in accordance with DIN EN 16892 and was 65%.

A creep test was carried out on the crosslinked pipes at 115° C. in the presence of 4 ppm of chlorine at a load of 1.58 MPa. The test was carried out in accordance with ASTM F2023. The time-to-failure achieved is shown in table 1.

COMPARATIVE EXAMPLE

For comparison, a commercial PEXc material Lupolen 4261A Q416 from Basell was extruded to produce pipes having the dimensions 16×2 mm and radiation-crosslinked at 120 kGy. The degree of crosslinking was found to be 63%.

A creep test was carried out on the crosslinked pipes at 115° C. in the presence of 4 ppm of chlorine at a load of 1.58 MPa. The test was carried out in accordance with ASTM F2023.

TABLE 1

| Example No. | Time to rupture in pressure test, in h |
|---|---|
| Example 1 | 1186 |
| Example 2 | 960 |
| Example 3 | 1459 |
| Example 4 | 1453 |
| Comparison | 524 |

The invention claimed is:

1. A process for forming a pipe comprising the steps of:
   (i) forming a molding composition by admixing:
      (a) a thermoplastic polyolefin;
      (b) 0.01 to 1.0% by weight, based on the total weight of the molding composition, of an organic polyoxy compound having the chemical formula:

$R-[(CH_2)_n-O]_m-H$ wherein
      n is an integer in the range from 1 to 10,
      m is an integer in the range from 3 to 500 and
      R is a hydrogen atom, an OH group or an alkyl group wherein the alkyl group has from 1 to 10 carbon atoms and may bear further substituents selected from the group consisting of —OH, —COOH, —OCH$_3$ and —OC$_2$H$_5$,
      wherein the organic polyoxy compound has a mean molar mass in a range from 400 to 9000 g/mol; and
   (c) 0.1 to 5.0% by weight, based on the total weight of the molding composition, of an unsaturated aliphatic hydrocarbon compound selected from the group consisting of a polyisoprene, polyoctenamer and a polydecenamer;
   (ii) pelletizing the molding composition to form pellets;
   (iii) extruding the pellets in the form of a pipe; and
   (iv) crosslinking the pipe.

2. The process according to claim 1, wherein the organic polyoxy compound is polyethylene glycol, methoxypolyethylene glycol or polypropylene glycol.

3. The process according to claim 1, wherein the organic polyoxy compound has a mean molar mass of 400 g/mol or 9000 g/mol.

4. The process according to claim 1, wherein the organic polyoxy compound is present in an amount from 0.01 to 0.5% by weight.

5. The process according to claim 1, wherein the thermoplastic polyolefin comprises polyethylene, polypropylene or copolymers of polyethylene or polypropylene with olefinically unsaturated monomers having from 4 to 10 carbon atoms.

6. The process according to claim 1, wherein the molding composition further comprises:
   up to 10% by weight, based on the total weight of the molding composition of an additive wherein the additive is selected from the group consisting of a heat stabilizer, an antioxidant, a UV absorber, a light stabilizer, a metal deactivator, a peroxide-destroying compound, a basic costabilizer and combinations thereof.

* * * * *